US007103972B2

(12) United States Patent
Chen et al.

(10) Patent No.: US 7,103,972 B2
(45) Date of Patent: Sep. 12, 2006

(54) METHOD OF FABRICATING A FLUID EJECTION DEVICE

(75) Inventors: Chien-Hua Chen, C rvallis, OR (US); Charles C Haluzak, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 343 days.

(21) Appl. No.: 10/695,147

(22) Filed: Oct. 28, 2003

(65) Prior Publication Data

US 2004/0104198 A1 Jun. 3, 2004

Related U.S. Application Data

(62) Division of application No. 10/003,600, filed on Oct. 31, 2001, now Pat. No. 6,679,587.

(51) Int. Cl.
*B21D 53/76* (2006.01)
*G01D 15/00* (2006.01)

(52) U.S. Cl. ......................... 29/890.1; 29/830; 29/831; 29/832; 216/27

(58) Field of Classification Search ............... 29/890.1, 29/830, 832, 831; 347/63, 20, 54, 56, 67, 347/65; 216/27; 346/140 R
See application file for complete search history.

(56) References Cited

U.S. PATENT DOCUMENTS

| | | | | |
|---|---|---|---|---|
| 4,412,224 A * | 10/1983 | Sugitani | ...................... | 347/65 |
| 4,509,063 A * | 4/1985 | Sugitani et al. | ............... | 347/65 |
| 4,558,333 A * | 12/1985 | Sugitani et al. | ............... | 347/65 |
| 4,601,777 A * | 7/1986 | Hawkins et al. | .............. | 216/27 |
| 4,639,748 A * | 1/1987 | Drake et al. | .................. | 347/67 |
| 4,786,357 A * | 11/1988 | Campanelli et al. | .......... | 216/27 |
| 4,822,755 A * | 4/1989 | Hawkins et al. | .............. | 438/21 |
| 4,894,664 A | 1/1990 | Tsung Pan | | |
| 5,124,717 A * | 6/1992 | Campanelli et al. | .......... | 347/93 |
| 5,387,314 A | 2/1995 | Baughman et al. | | |
| 5,706,041 A | 1/1998 | Kubby | | |
| 5,851,412 A | 12/1998 | Kubby | | |
| 5,852,459 A | 12/1998 | Pawlowski, Jr. et al. | | |
| 5,876,497 A | 3/1999 | Atoji | | |
| 5,971,527 A | 10/1999 | Peeters et al. | | |
| 6,000,787 A | 12/1999 | Weber et al. | | |
| 6,033,581 A | 3/2000 | Kobayashi | | |
| 6,103,099 A | 8/2000 | Wittenbrink et al. | | |
| 6,264,309 B1 | 7/2001 | Sullivan | | |
| 6,342,401 B1 * | 1/2002 | Tom | ............................ | 438/17 |
| 6,398,348 B1 | 6/2002 | Haluzak et al. | | |

* cited by examiner

*Primary Examiner*—A. Dexter Tugbang
*Assistant Examiner*—Tai Nguyen

(57) ABSTRACT

A fluid ejection device comprising a composite substrate, wherein the composite substrate has two substrates with a patterned etch mask therebetween, and a fluid channel.

17 Claims, 9 Drawing Sheets

METHOD OF FABRICATING A FLUID EJECTION DEVICE

CROSS-REFERENCE TO RELATED APPLICATIONS

This application is a Divisional of U.S. patent application Ser. No. 10/003,600 filed on Oct. 31, 2001, now U.S. Pat. No. 6,679,587 which is incorporated herein by reference.

FIELD OF THE INVENTION

This invention relates to fluid ejection devices and methods of fabrication.

BACKGROUND

Inkjet printers typically have a print cartridge attached to a carriage that scans across the width of a sheet of print media in a printer. An ink reservoir, either attached to the carriage or external to the carriage, supplies ink to ejection chambers on the printhead. Each ejection chamber contains a fluid ejection element, such as a heater resistor, piezoelectric element, or an electrostatic element, which is independently addressable. Energizing an ejection element causes a droplet of marking fluid to be ejected through a nozzle, creating a dot on a print media. This pattern of dots creates graphical images or text characters on the media.

High quality resolution and printing speeds are desired of print heads. In some print heads an orifice layer, defined by a nozzle and firing chamber, is formed over the substrate prior to etching the fluid channel through the substrate. This etch process exposes the orifice layer to very aggressive etchants for prolonged periods of time and has a detrimental effect on its physical properties. Specifically, the etchant has been shown to cause brittleness of the orifice layer materials and attack the interface between the orifice layer and substrate.

Hence, there is a desire for a high performance print head and a method of manufacturing that does not expose the orifice layer to aggressive etchants for prolonged periods of time.

SUMMARY

A fluid ejection device comprising a composite substrate, wherein the composite substrate has two substrates with a patterned etch mask therebetween, and a fluid channel.

Many of the attendant features of this invention will be more readily appreciated as the invention becomes better understood by the following detailed description and considered in connection with the accompanying drawings. Like reference symbols designate like parts through out, though not necessarily identical.

BRIEF DESCRIPTION OF THE DRAWINGS

The invention is better understood with reference to the following drawings. The elements illustrated in the drawings are not necessarily to scale, rather emphasis has been placed upon clearly illustrating the invention.

DETAILED DESCRIPTION OF THE EMBODIMENTS

In one embodiment fluid channels are formed with out exposing the orifice layer to aggressive etchants for extended periods of time. In another embodiment, the variations in fluid channel dimensions and positional tolerances are minimized. In yet another embodiment, complex etched features are formed with relatively simple masking and etching steps.

Figure 1:
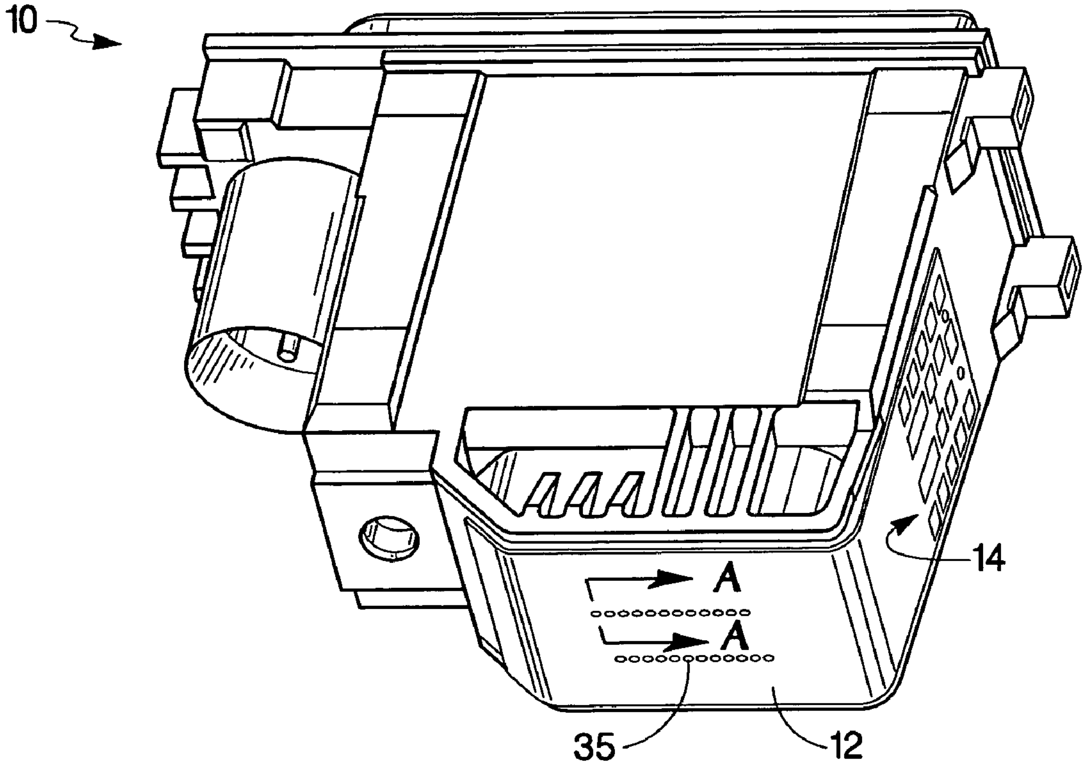
FIG. 1 is a perspective view of one embodiment of a print cartridge of the present invention.

FIG. 1 is a perspective view of one embodiment of a print cartridge 10, which may incorporate the structures described herein. The print cartridge 10 is the type that receives fluid from an external supply connected via a tube but alternate designs may include the supply of fluid within its body or mounted to the cartridge itself. The print cartridge 10 has a printhead 12 with nozzles 35, and electrical contacts 14 to electrically couple the cartridge with a printer.

Figure 2:
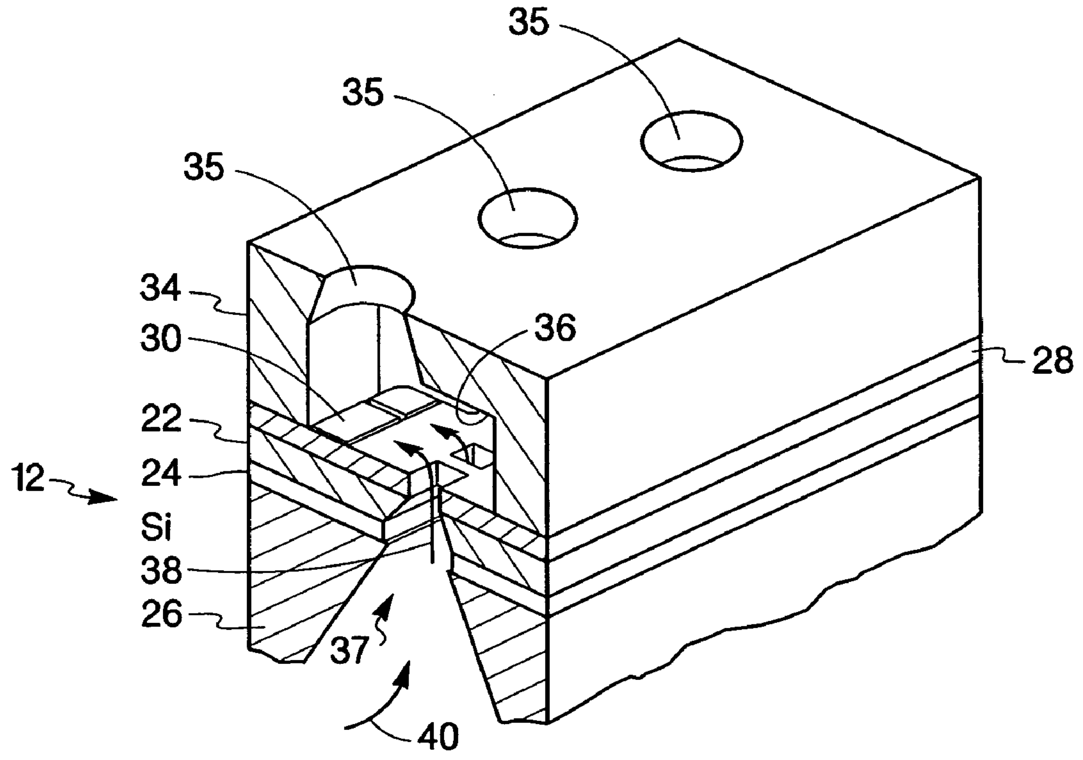
FIG. 2 is cross-sectional perspective view of a portion of a print head illustrating one embodiment of the invention.

FIG. 2 is a cross sectional perspective view of the printhead 12 of FIG. 1 taken along view A—A. Although printhead 12 may have several hundred nozzles and ejection elements, a single fluid firing chamber 36 is used to illustrate this embodiment of the invention. The printhead 12 is composed of first and second silicon substrates with an oxide layer 24 formed between a top surface of the first substrate 26 and a bottom surface of the second substrate 22. Thin film layers 28, including drop ejection elements 30, are formed on a top surface of the second substrate 22. An orifice layer 34 containing nozzles 35 and firing chambers 36 is formed over the thinfilm layers 28 to complete the structure. At least one feed hole 38 is formed through the thin film layers 28 and second substrate 22 extending through the oxide layer 24. At least one feed trench 37 extends through the second substrate 26 intersecting with the feed holes 38 to forming fluid channel 40. The fluid channel 40 fluidically couples the bottom surface of the first substrate 26 with the top surface of the second substrate 22. The fluid is supplied to the back side of the printhead 12 and is channeled into the ejection chamber 36, which contains a fluid ejection element (or heater resistor) 30. Electrical signals energize the fluid ejection element 30, which in turn ejects a droplet of fluid through the nozzle 35.

Figure 3:
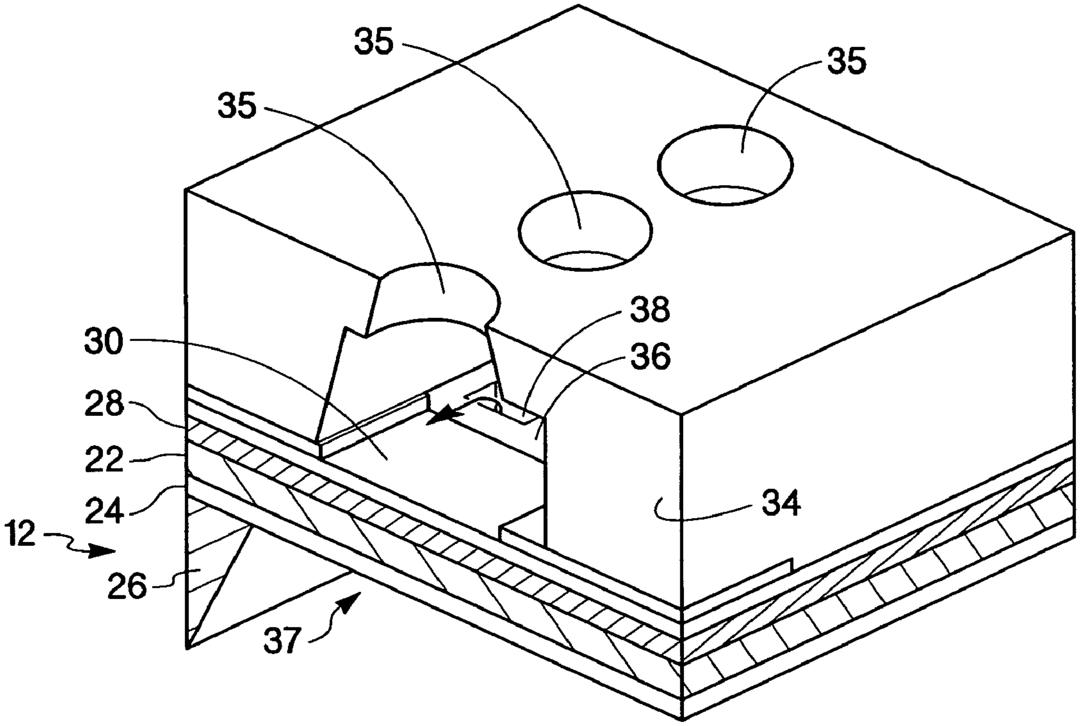
FIG. 3 is cross-sectional perspective view of a portion of a print head illustrating an alternate embodiment of the invention.

FIG. 3 is a cross sectional perspective view of FIG. 1 also taken along view A—A and depicts an alternate embodiment. In this particular embodiment the fluid ejection element 30 is suspended over the feed trench 37 on the second silicon substrate 22 and the thermal oxide 24 layer. Suspending the ejector element 30 over the feed trench 37 shortens the fluid path and reduces the refill time of the firing chamber 36. This in turn increases the firing frequency of the printhead 12.

Figure 4:
FIGS. 4–8 are cross-sectional views showing various steps used in one process for forming a print head in accordance with the present invention.

FIG. 4 is a cross sectional view of a silicon substrate 54 after a series of partial feed trenches 56 have been etched in a top surface. The substrate 54 has a <110> crystallographic orientation and a layer of field oxide (FOX) 58 formed over the top surface. Photo resist is applied over the top surface of the wafer, exposed, and developed to form the desired pattern. The field oxide 58 is then etched away using a buffered oxide etch or a dry etch to define the dimensions and position of the feed trenches 56. The wafer is then wet etched with TMAH to form the feed trenches 56 partially through the substrate 54. In an alternate embodiment, the feed trenches 56 are formed completely through the substrate 54. In another alternate embodiment the field oxide 58 is formed over the top and bottom surfaces of the substrate 54.

Figure 5:
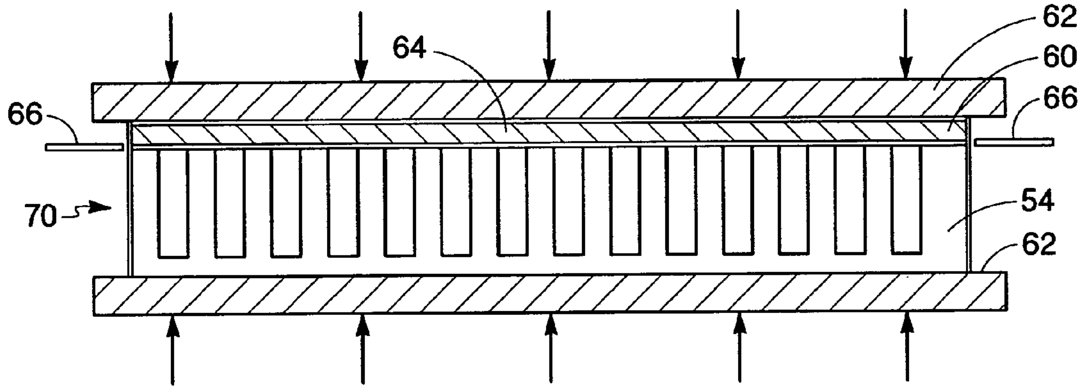

FIG. 5 depicts substrate 54 being bonded to a second substrate 60 to form a starting or composite substrate 70. The second substrate 60 has a <100> orientation and a layer of field oxide over the bottom surface. In an alternate embodiment field oxide is formed over the top and bottom surfaces of the second substrate 60.

There are several wafer bonding techniques that can be used to bond these two substrates together including: anodic bonding, silicon direct bonding, or intermediate layer bonding. Silicon direct wafer bonding (DWB) also known as fusion bonding, is performed by joining the two silicon wafers together under temperature and pressure. The wafers are first cleaned using a standard process such as BCI or oxygen plasma. The wafers are then aligned using for example an Electronic Visions EV640 bond aligner, and clamped together with a bond fixture 62. The bond fixture 62 is then loaded into for example an Electronic Visions EV520 wafer bonder where the wafers are heated under a partial vacuum. The bond is initiated by pressing the middle of one of the substrates 64 to create an initial contact point while mechanical spacers 66 keep the wafers physically separated. Upon removal of the spacers a single bonding wave propagates from the center of the substrates and completes the bond. Following bonding, the composite substrate 70 is thermally annealed to increase the bond strength. Depending upon the application, the thickness of the composite substrate 70 can be reduced by back grinding or chemical milling.

Figure 6:
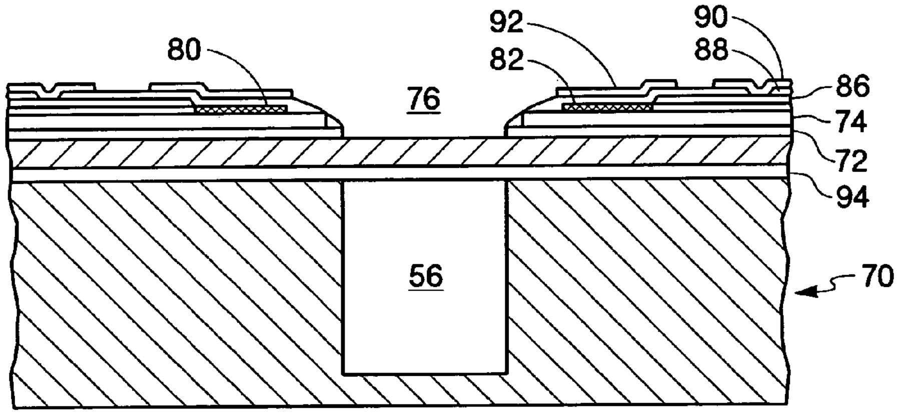

FIG. 6 is an expanded view of one of the feed trenches 56 shown in FIG. 5. In one embodiment a series of thin film layers is formed on the top surface of the substrate 70. A layer of field oxide (FOX) 72 is grown over the substrate 70 by thermal oxidation. Next a phosphosilicate glass (PSG) layer 74 is deposited using a PECVD process. The PSG layer 74 is then masked and etched to expose a portion of the FOX 72. The FOX 72 is masked and etched to form opening 76. A layer of TaAl is deposited and etched to form resistors 80 and 82. Next a layer of AlCu 86 is deposited and etched to form the various electrical conductors. A passivation layer 88 composed of silicon nitride and silicon carbide is then deposited over the thin films and etched to expose selected portions of the conductors. A cavitation protective layer of tantalum 92 and a conductive layer of gold 90 are then deposited, masked, and etched. The gold layer 90 is in electrical contact with the conductors at the exposed portions. Next, the silicon exposed by the opening 76 is etched using a deep reactive ion etch (DRIE) using for example a BOSCH™ process. Feed holes (not shown) are etched in the silicon with the intermediate oxide layer 94 acting as an etch stop. The thin film materials and layers are not limited to those described.

Figure 7:
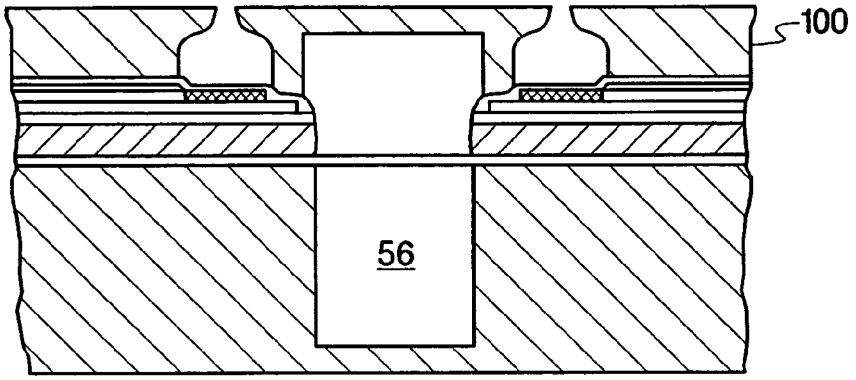
Figure 8:
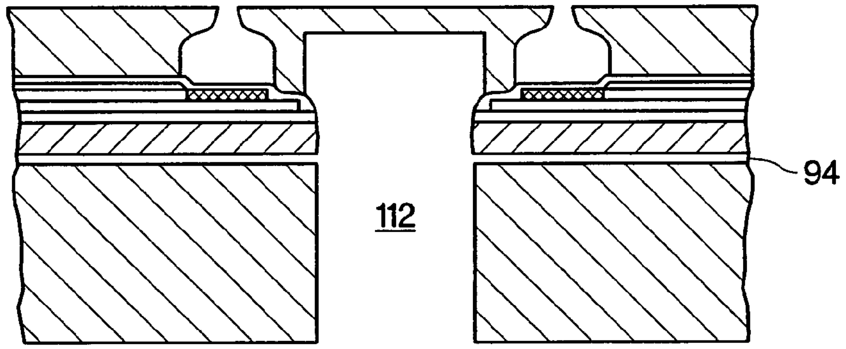

In FIG. 7, a layer of photo imageable polymer material (i.e. SU8 manufactured by Micro Chem Corporation) is applied to the wafer with a thickness of approximately 34 microns and is used in one embodiment to form the orifice layer 100. The backside of the substrate is chemically milled or back ground to open the feed trench 56. The wafer is then dipped in a buffered oxide etch to remove the exposed portion of the oxide layer 94 and the contaminates from the fluid channel 112, as shown in FIG. 8.

Figure 9:
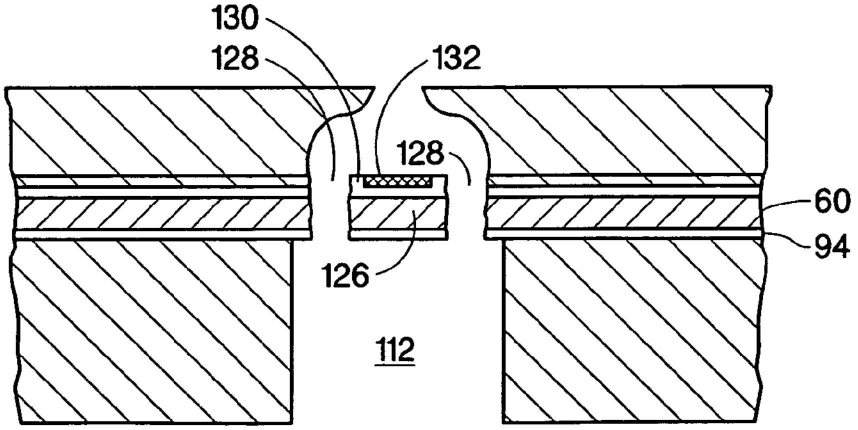
FIGS. 9–13 are cross-sectional views showing various steps used in an alternate process for forming a print head in accordance with the present invention.

FIG. 9 illustrates an alternate embodiment of the previously described printhead 12. Etching feed holes 128 in the oxide layer 94 and second substrate 60 creates a silicon membrane 126. The membrane 126 performs two functions; it provides mechanical support for the thin film layers 130 to prevent thermal buckling, and it conducts heat away from the heater resistor 132 into the silicon membrane 126. The feed holes 128 are formed using either a wet or dry silicon etch and include individual holes or a trench along the length of the print head.

FIGS. 10 through 13 illustrate an alternate manufacturing technique wherein the field oxide layer on the top surface of the substrate 54 is patterned to form a mask layer 140. The top surface of the substrate 54 is then bonded to the bottom surface of the second substrate 60 to form a patterned etch mask 142 between the substrates. The patterned etch mask 142 is then used to form fluid channels and feed holes.

Figure 10:
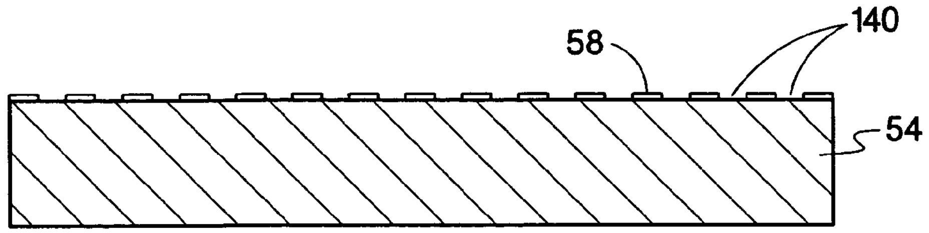

FIG. 10 is a cross sectional view of a silicon substrate 54, which has a layer of field oxide (FOX) 58 over a top surface. Photo resist is applied over the top of the wafer, exposed, and developed to form the desired pattern. The field oxide 58 is then etched away using a buffered oxide etch or a dry etch to define a patterned mask layer 140.

Figure 11:
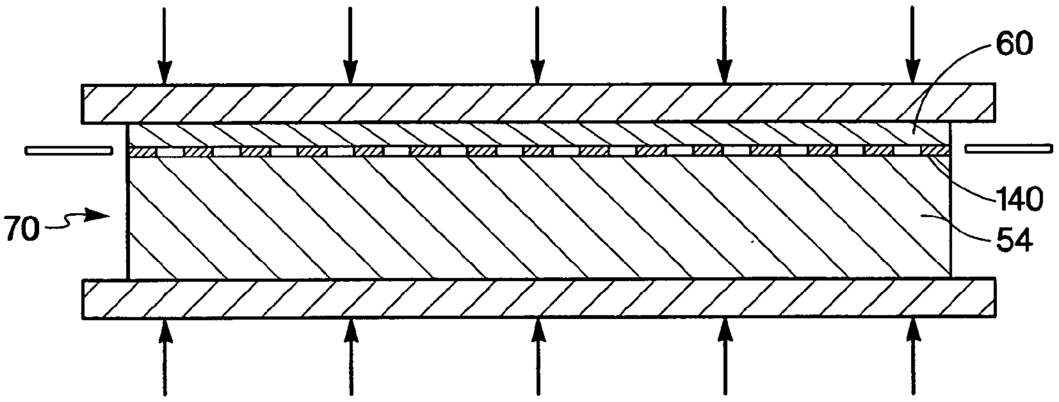

FIG. 11 depicts a substrate 54 being bonded to a second substrate 60 to form a starting or composite substrate 70. The patterned mask layer 140 has been embedded between the two substrates.

Figure 12:
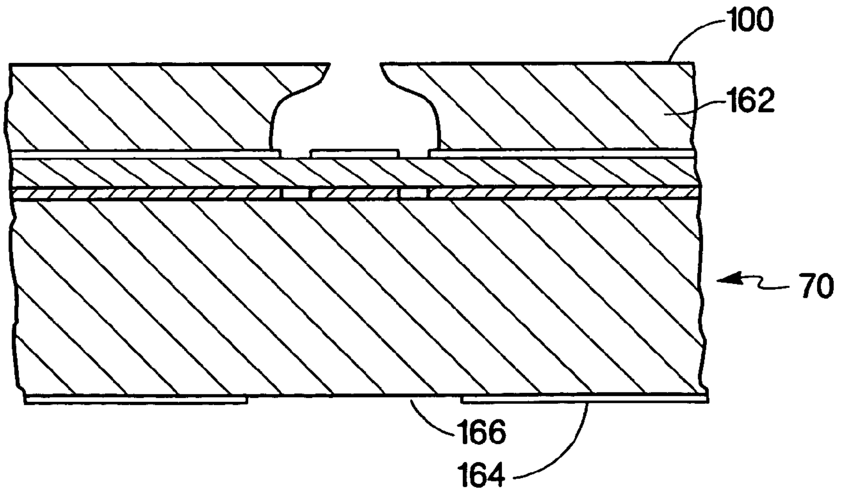

FIG. 12 is an expanded view of a fluid ejection device utilizing the composite substrate 70 of FIG. 11. In one embodiment, thin film layers 162 and an orifice layer 100 are formed on the top surface. The field oxide on the back of the substrate 164 is masked and etched to define a pattern 166 for a fluid channel (not shown).

Figure 13:
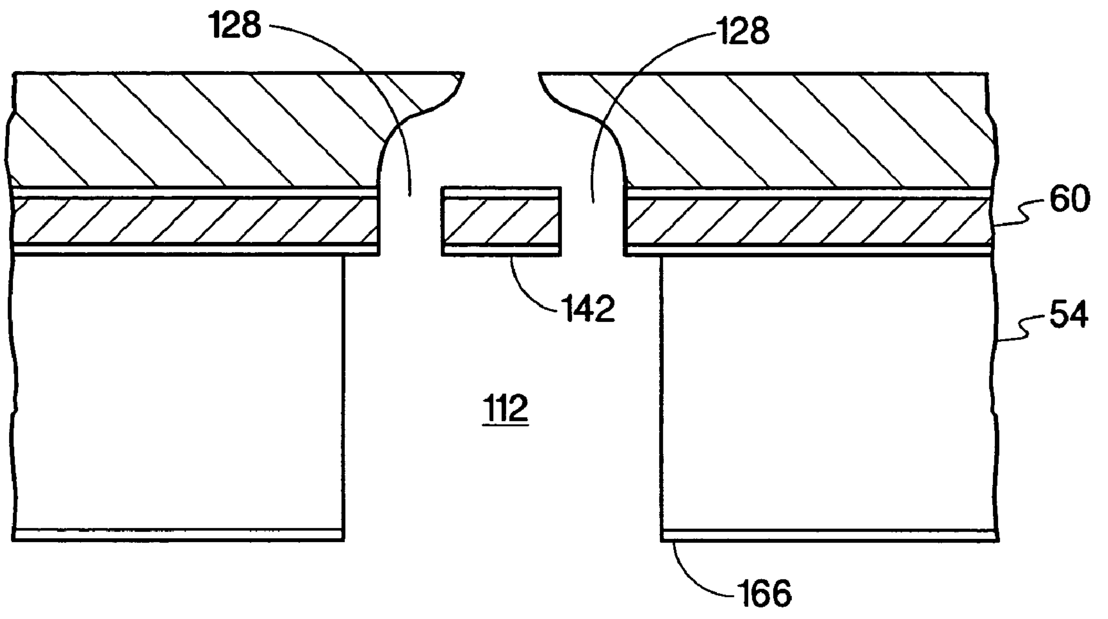

In FIG. 13, the substrate exposed by the pattern 166 is etched using a deep reactive ion etch (DRIE) with the patterned etch mask 142 acting as an etch stop and forming fluid channel 112 and at least one feed hole 128. Note that the dimensions and position of the feed holes 128 are defined by the patterned etch mask 142. Since these features are only formed through the second substrate 60, the alignment between the thinfilm layers 162 and feed holes 128 is greatly improved.

Figure 14:
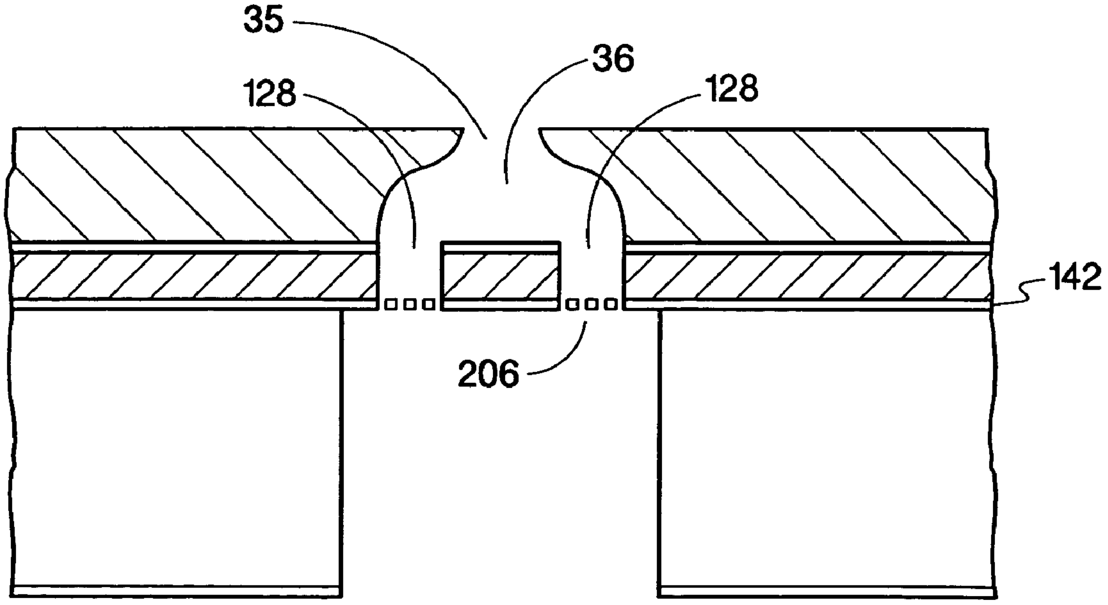
FIG. 14 is cross-sectional perspective view of one embodiment of a print head with particle tolerant fluidic features.

FIG. 14 illustrates an alternate embodiment of the printhead 12 previously described, which incorporates a series of particle trapping features 206 etched in the patterned etch mask 142. By placing these features in the fluid channel, particles are prevented from entering the feed holes 128 and firing chambers 36 where they could impact refilling of the firing chamber 36 or ejection of fluid through the nozzle 35. In one embodiment, the particle trapping features 206 are a series of fine holes or small fluid passages with dimensions smaller than the particles that are prevented from entering the firing chamber. Placing the particle trapping features in the etch mask rather than in the barrier or orifice layer greatly simplifies the process steps to provide particle tolerance to a print head.

Figure 15:
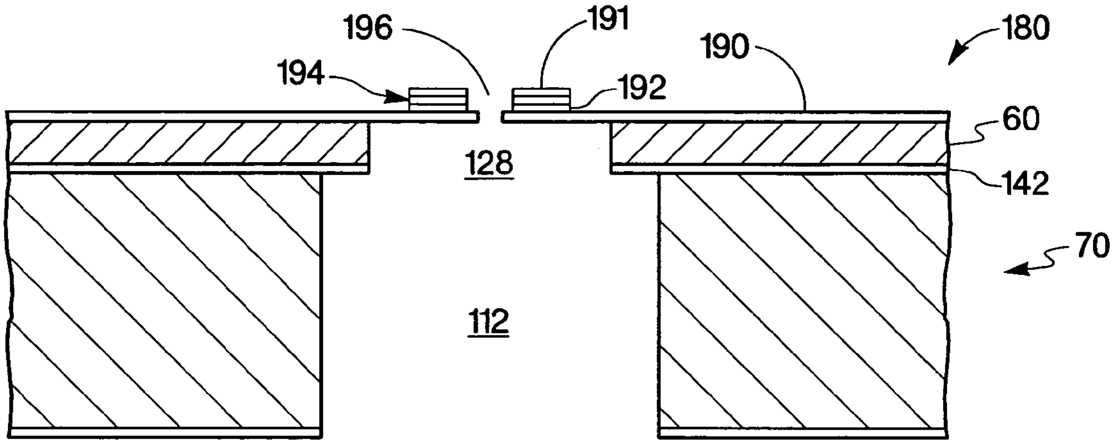
FIG. 15 is a cross-sectional perspective view of a drop ejection device illustrating a further embodiment of the invention.

FIG. 15 illustrates a further alternate embodiment of a fluid ejection device 180 incorporating the previously described composite substrate 70. The fluid ejection device includes: a silicon nitride membrane 190, conductors 191 and 192, and actuator 194. The composite substrate 70 and membrane 190 define a fluid reservoir which has a fluid ejection aperture 196 formed in the center of the membrane 190. Drops of fluid are ejected through the aperture 196 when the actuator 194 deflects the membrane. The membrane could be actuated by several different techniques including: piezoelectric actuation, electrostatic actuator (not shown), or a thermo-mechanical actuator (not shown).

To operate efficiently, the dimensions of the membrane 190 are tightly controlled to ensure that it deflects uniformly when deformed. However, wet and dry etching techniques when etching completely through a substrate do not have precise dimensional and positional control. One solution is to form the device on a composite substrate 70 with a patterned etch mask 142. When the substrate is etched to form the fluid channel 112 and feed hole 128, the etch mask 142 defines the dimensions of the membrane. Since the etch is performed through the thinner second substrate 60, the membrane dimensions and position are much more controllable.

Figure 16:
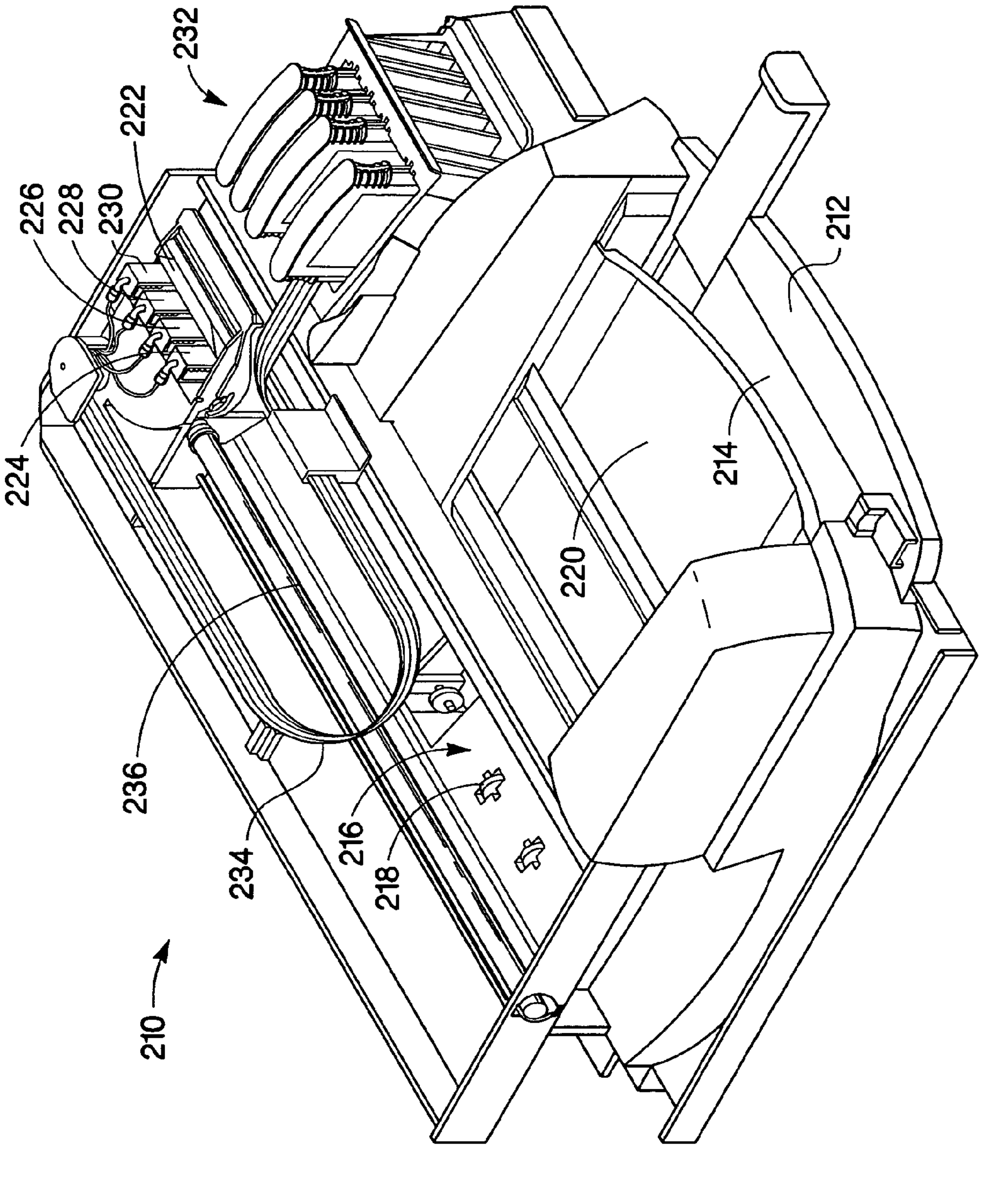
FIG. 16 illustrates one embodiment of a printer that incorporates the print head of the present invention.

FIG. 16 illustrates one embodiment of a printer 210 that can incorporate the previously described print cartridge 10. Those skilled in the art will recognize that there are many printer designs that may incorporate the invention.

The printer includes an input tray 212 containing sheets of media 214 which are feed through a print zone 216 by feed rollers 218. Once the media 214 is printed upon it is forwarded to an output tray 220 for collection. The scannable carriage 222 holds print cartridges 224–230, which print cyan, magenta, yellow, and black marking fluids. In one embodiment, the marking fluids are supplied from replaceable fluid supplies 232 to their associated print cartridges via flexible tubes 234. The print cartridges may also contain a supply of marking fluid and may be refillable or non-refillable. In another embodiment, the fluid supplies are separate from the print heads and are fluidically coupled by a separable connection.

The carriage 222 is actuated in the scan axis by a belt and pulley system and translates on a slider rod 236. Printing signals from a control device such as a personal computer, are processed by the printer 210 to generate a bitmap of the dots to be printed. The bitmap is then converted into firing signals, which are sent to the print cartridges 224–230, causing the various fluid ejection elements to be selectively fired at the appropriate times. As the print cartridges 224–230 scan across the sheet of media 214, the swaths printed by the cartridges 224–230 overlap forming graphical images or text characters.

In another embodiment, the print cartridges 224–230 are stationary and they print on a moving strip or sheet of media 214.

Although this invention has been described in certain specific embodiments, many additional modifications and variations will be apparent to those skilled in the art. It is therefore to be understood that this invention may be practiced other than as specifically described. Thus, the present embodiments of the invention should be considered in all respects as illustrative and not restrictive, the scope of the invention to be indicated by the appended claims rather than the foregoing description.

What is claimed is:

1. A method of fabricating a fluid ejection device comprising:

bonding a top surface of a first substrate to a bottom surface of a second substrate, wherein a patterned etch mask layer is formed on at least one of the top surface of the first substrate and the bottom surface of the second substrate prior to bonding; and etching a fluid channel in the first and second substrates extending through an opening in the patterned etch mask layer.

2. The method of claim 1 further comprising thermally growing oxide on at least one of the top surface of the first substrate and the bottom surface of the second substrate to form the patterned etch mask.

3. The method of claim 1 further comprising heating the bonded substrates to thermally anneal them.

4. The method of claim 1 further comprising thinning the bonded substrates.

5. The method of claim 1 wherein the first and second substrates have different crystallographic orientations.

6. The method of claim 1 wherein the fluid channel is formed using a dry etch.

7. The method of claim 1 wherein the fluid channel is formed using a wet etch.

8. The method of claim 1 wherein the fluid channel is formed using dry and wet etching.

9. A method of fabricating a fluid channel for a fluid ejection device comprising:

bonding a top surface of a first substrate to a bottom surface of a second substrate, such that a patterned etch mask layer is formed on at least one of the to surface of the first substrate and the bottom surface of the second substrate prior to bonding, wherein the top surface of the first substrate has a feed trench;

etching a feed hole from a top surface of the second substrate to the top surface of the first substrate; and removing a remaining portion of the first substrate to form a fluid channel through the substrates.

10. The method of claim 9 further comprising aligning the first and second substrates prior to bonding.

11. The method of claim 9 further comprising heating the bonded substrates to thermally anneal them.

12. The method of claim 9 further comprising thinning the bonded substrate.

13. The method of claim 9 wherein the first and second substrates have different crystallographic orientations.

14. The method of claim 9 wherein the feed trench and feed hole are formed using a dry etch.

15. The method of claim 9 wherein the feed trench and feed hole are formed using a wet etch.

16. The method of claim 9 wherein the feed trench and feed hole are formed using dry and wet etching.

17. The method of claim 9 further comprising removing an intermediate layer disposed between the first and second substrates to fluidically couple the top surface of the second substrate to the bottom surface of the first substrate.

* * * * *

UNITED STATES PATENT AND TRADEMARK OFFICE

CERTIFICATE OF CORRECTION

PATENT NO. : 7,103,972 B2
APPLICATION NO. : 10/695147
DATED : September 12, 2006
INVENTOR(S) : Chien-Hua Chen et al.

It is certified that error appears in the above-identified patent and that said Letters Patent is hereby corrected as shown below:

On the face page, in field (75), in "Inventors", in column 1, line 1, delete "C rvallis" and insert -- Corvallis --, therefor.

On the face page, in field (57), under "Abstract", in column 2, lines 1-3, delete "A fluid ejection device comprising a composite substrate, wherein the composite substrate has two substrates with a patterned etch mask therebetween, and a fluid channel." and insert -- A Method of fabricating a fluid ejection device comprising: bonding a top surface of a first substrate to a bottom surface of a second substrate, wherein a patterned etch mask layer is formed on at least one of the top surface of the first substrate and the bottom surface of the second substrate; and etching a fluid channel in the first and second substrates extending through an opening in the patterned etch mask layer. --, therefor.

In column 2, line 53, delete "second" and insert -- first --, therefor.

In column 2, line 54, delete "forming" and insert -- form --, therefor.

In column 6, line 36, in Claim 9, before "surface" delete "to" and insert -- top --, therefor.

Signed and Sealed this

Fourteenth Day of April, 2009

*John Doll*

JOHN DOLL
*Acting Director of the United States Patent and Trademark Office*